United States Patent
Kim et al.

(10) Patent No.: US 10,156,977 B2
(45) Date of Patent: Dec. 18, 2018

(54) WATCH TYPE TERMINAL AND CONTROL METHOD THEREOF

(71) Applicant: LG ELECTRONICS INC., Seoul (KR)

(72) Inventors: Taeseong Kim, Seoul (KR); Yujune Jang, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 14/689,079

(22) Filed: Apr. 17, 2015

(65) Prior Publication Data

US 2015/0363065 A1    Dec. 17, 2015

(30) Foreign Application Priority Data

Jun. 12, 2014  (KR) .................. 10-2014-0071598

(51) Int. Cl.

| | |
|---|---|
| *G06F 3/041* | (2006.01) |
| *G06F 3/044* | (2006.01) |
| *G06F 1/16* | (2006.01) |
| *G06F 3/0488* | (2013.01) |
| *G04G 9/00* | (2006.01) |
| *G04G 21/08* | (2010.01) |
| *G06F 3/0481* | (2013.01) |
| *G06F 3/0482* | (2013.01) |
| *G06F 3/0484* | (2013.01) |

(52) U.S. Cl.
CPC ......... *G06F 3/0488* (2013.01); *G04G 9/0064* (2013.01); *G04G 21/08* (2013.01); *G06F 3/0416* (2013.01); *G06F 3/0482* (2013.01); *G06F 3/04817* (2013.01); *G06F 3/04842* (2013.01)

(58) Field of Classification Search
None
See application file for complete search history.

(56) References Cited

U.S. PATENT DOCUMENTS

| 6,597,378 B1 | 7/2003 | Shiraishi | |
|---|---|---|---|
| 2006/0007785 A1* | 1/2006 | Fernandez | G06Q 10/109 368/10 |
| 2008/0136785 A1* | 6/2008 | Baudisch | G06F 3/0488 345/173 |
| 2012/0066629 A1* | 3/2012 | Lee | G06F 3/04847 715/769 |

(Continued)

OTHER PUBLICATIONS

Xiao et al., "Expanding the Input Expressivity of Smartwatches with mechanical Pan, Twist, Tilt and Click," Proceedings of the 2014 ACM CHI Conference on Human Factors in Computing Systems, Toronto, Canada, Apr. 26, 2014-May 1, 2014, XP58046551, pp. 193-196.

*Primary Examiner* — Jeffrey A Gaffin
*Assistant Examiner* — Nhat Huy T Nguyen
(74) *Attorney, Agent, or Firm* — Birch, Stewart, Kolasch & Birch, LLP

(57) ABSTRACT

A watch type terminal including a main body; a touch screen provided on a front surface of the main body and configured to display time information; and a controller configured to receive an input for selecting a specific time range included in the displayed time information, and display event information corresponding to at least one event associated with the specific time range on the touch screen.

21 Claims, 13 Drawing Sheets

(56) References Cited

U.S. PATENT DOCUMENTS

2013/0170324 A1* 7/2013 Tu .......................... G04G 21/08
368/28
2014/0347289 A1* 11/2014 Suh ........................ G06F 3/017
345/173

* cited by examiner

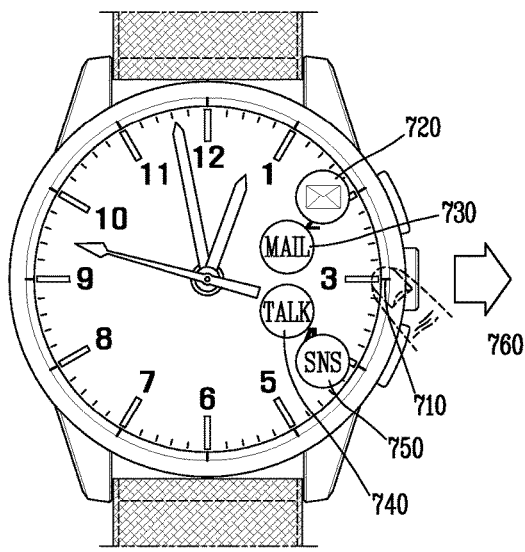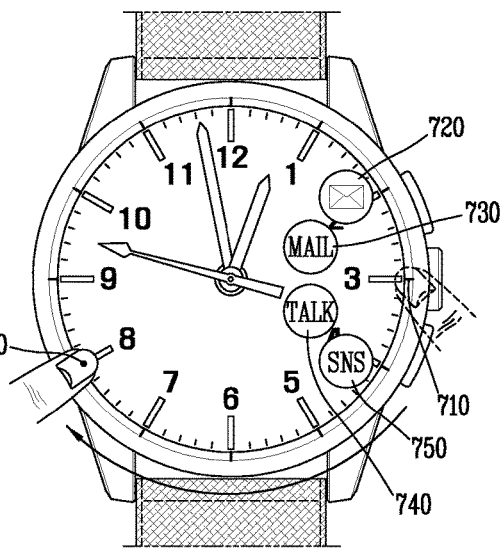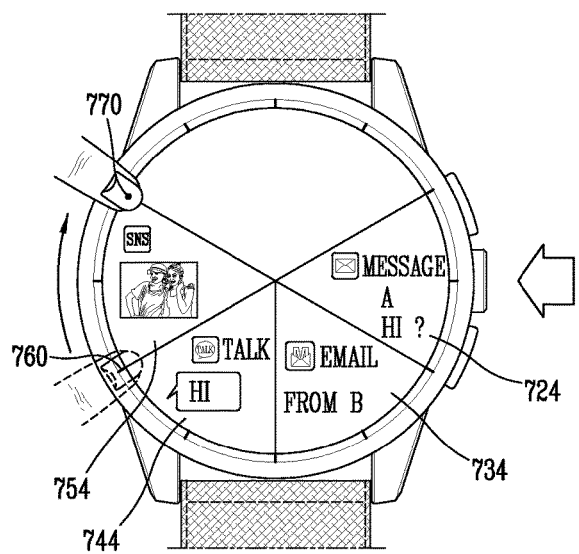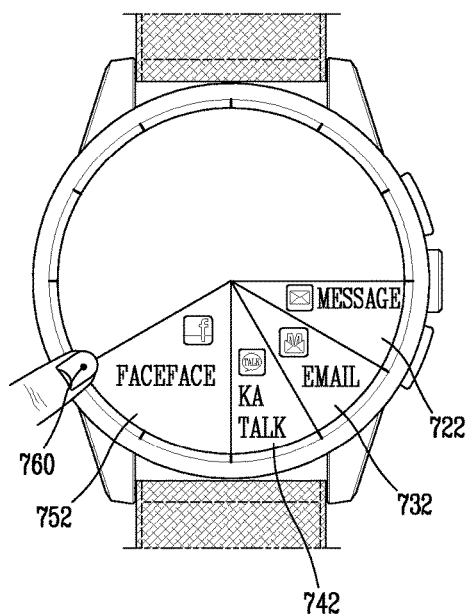

FIG. 13(a)
FIG. 13(b)
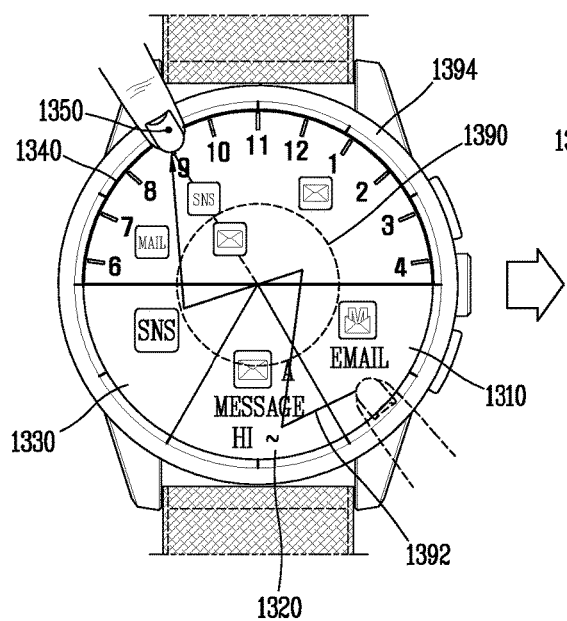
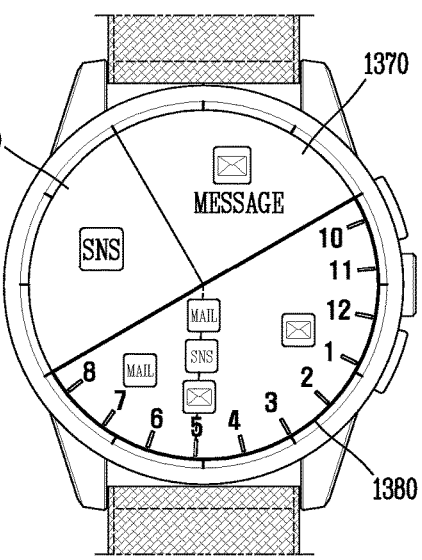

sure, there is provided a control method for a watch type terminal including a main body and a display unit. The control method may include (a) outputting screen information indicating time on the display unit, (b) selecting a specific time range, and (c) detecting at least one event associated with the specific time range, and outputting event information corresponding to each of the detected at least one event on the display unit.

WATCH TYPE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2014-0071598, filed on Jun. 12, 2014, the contents of which is incorporated by reference herein in its entirety.

BACKGROUND OF THE INVENTION

1. Field of the Invention

This specification relates to a watch type terminal which is wearable on a user's wrist, and a control method thereof.

2. Background of the Related Art

Terminals may be divided into mobile/portable terminals and stationary terminals. Also, the mobile terminals may be classified into handheld terminals and vehicle mount terminals according to whether or not a user can directly carry. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player. In recent time, a mobile terminal has gone beyond the usual technique of a user grasping the mobile terminal using his hand and extends to a wearable device which can be worn on a user's body. One example of such wearable device is a watch type terminal (or a watch-type terminal).

This watch type terminal may help a user easily checking time and time-related information. However, the watch type terminal should have a screen in a relatively small scale because it has to be worn on a wrist. This, accordingly, causes a problem that a screen region is obscured when the user applies a touch input thereto.

SUMMARY OF THE INVENTION

Therefore, an aspect of the detailed description is to overcome the aforementioned problems and other disadvantages.

Another aspect of the detailed description is to provide a watch type terminal, capable of detecting at least one event associated with a specific time range selected and outputting event information corresponding to each detected event, and a control method thereof.

To achieve these and other advantages and in accordance with the purpose of this specification, as embodied and broadly described herein, there is provided a watch type terminal including a main body, a display unit that is provided on a front surface of the main body and configured to output screen information indicating time, and a controller that is configured to detect at least one event associated with a selected specific time range, in response to an input for selecting the specific time range, and control event information corresponding to each of the detected at least event to be output on the display unit.

In accordance with an embodiment disclosed herein, the specific time range may be selected by a touch input applied onto a region where the screen information is output.

In accordance with an embodiment disclosed herein, the controller may control the event information to be output on a region of the display unit except for the region to which the touch input has been applied.

In accordance with an embodiment disclosed herein, the controller may detect event information, which is output on an opposite region of the touch input-applied region, as selected event information, among those output event information, and control the display unit to output an effect indicating the selection on a region where the selected event information is output.

In accordance with an embodiment disclosed herein, the controller may control the selected event information, among those output event information, to be output on a specific region of the display unit.

In accordance with an embodiment disclosed herein, the controller may control an application linked to the selected event information, among those output event information, to be executed on a specific region of the display unit.

In accordance with an embodiment disclosed herein, the controller may set an extent of the region of the display unit for outputting the event information therein, according to a preset type of touch input applied to the display unit.

In accordance with an embodiment disclosed herein, the controller may control the event information to be output in a different form according to the set extent of the region of the display unit.

In accordance with an embodiment disclosed herein, the controller may control at least one of an icon corresponding to the event information and a name of an application linked to the event information to be output according to the set extent of the region of the display unit.

In accordance with another aspect of the present disclosure, there is provided a control method for a watch type terminal including a main body and a display unit. The control method may include (a) outputting screen information indicating time on the display unit, (b) selecting a specific time range, and (c) detecting at least one event associated with the specific time range, and outputting event information corresponding to each of the detected at least one event on the display unit.

In accordance with an embodiment disclosed herein, the specific time range may be selected by a touch input applied to a region where the screen information is output.

In accordance with an embodiment disclosed herein, the step (c) may include outputting the event information on a region of the display unit except for the touch input-applied region.

In accordance with an embodiment disclosed herein, the step (c) may include detecting event information, which is output on an opposite region of the touch input-applied region, as selected event information, among those output event information, and outputting an effect indicating the selection on a region of the display unit on which the selected event information is output.

In accordance with an embodiment disclosed herein, the step (c) may include outputting the selected event information, among those output event information, on a specific region of the display unit.

In accordance with an embodiment disclosed herein, the step (c) may include executing an application linked to the selected event information, among those output event information, on a specific region of the display unit.

In accordance with an embodiment disclosed herein, the step (c) may include setting an extent of the region of the display unit for outputting the event information, according to a preset type of touch input applied to the display unit.

In accordance with an embodiment disclosed herein, the step (c) may include outputting the event information in a different form according to the set extent of the region of the display unit.

In accordance with an embodiment disclosed herein, the step (c) may include outputting at least one of an icon corresponding to the event information and a name of an application linked to the event information, according to the set extent of the region of the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings:

FIGS. 7(a) to 8(b) are conceptual views illustrating embodiments in which event information is output in a different manner according to an area of a touch region (or a touched point); and FIGS. 9(a) to 13(b) are conceptual views illustrating another embodiments related to an output of event information.

DETAILED DESCRIPTION OF THE DISCLOSURE

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
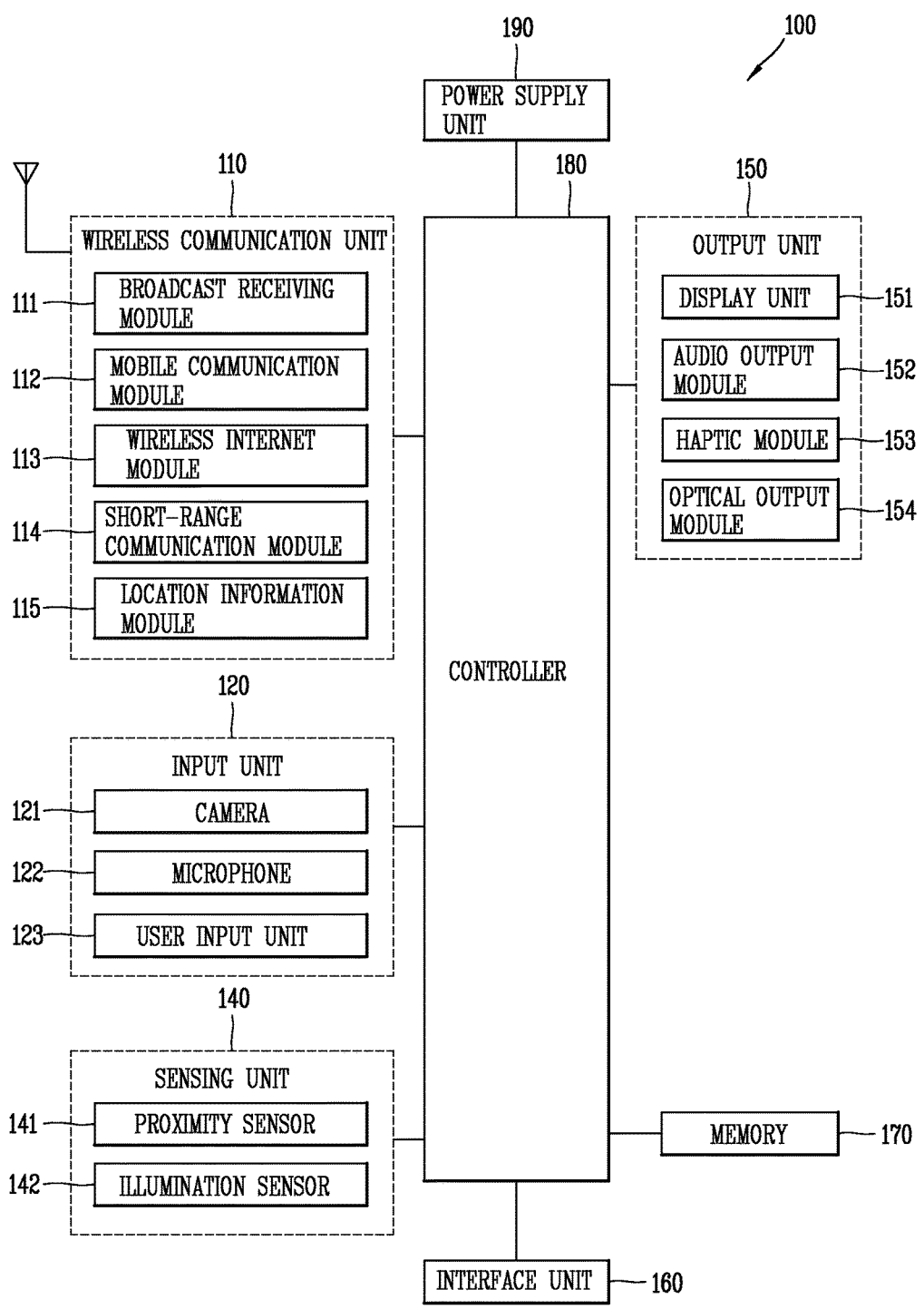
FIG. 1A is a block diagram of a mobile terminal in accordance with the present disclosure.
Figure 1B:
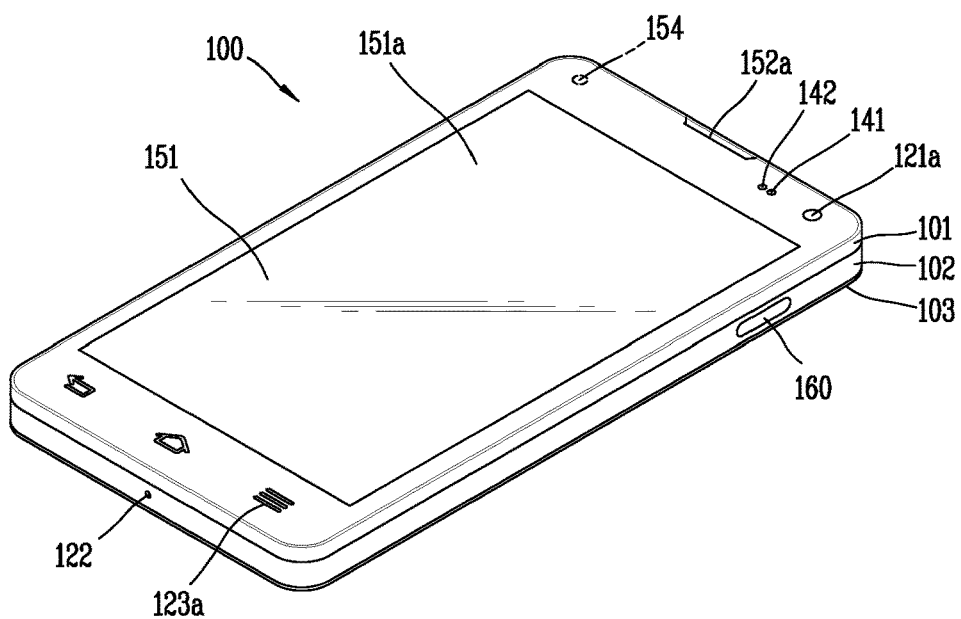
FIGS. 1B and 1C are conceptual views illustrating one example of the mobile terminal, viewed from different directions.
Figure 1C:
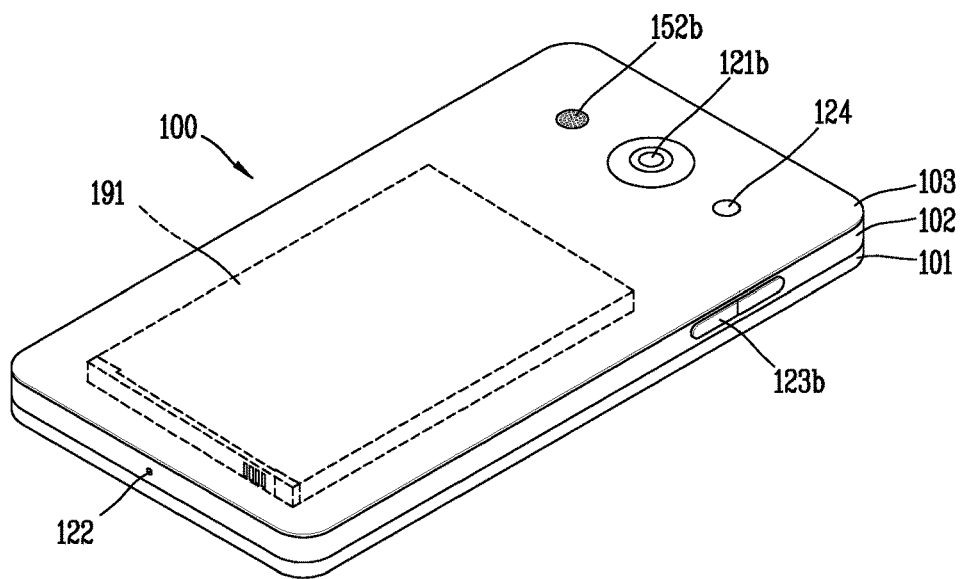

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output. The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, a mobile terminal may extend to a wearable device which is wearable on a human body. Such devices go beyond the usual technique of a user grasping the mobile terminal using his hand. Examples of the wearable device include a smart watch, a smart glass, a head mounted display (HMD), and the like. Hereinafter, examples of the mobile terminals extended to the wearable devices will be described.

The wearable device can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
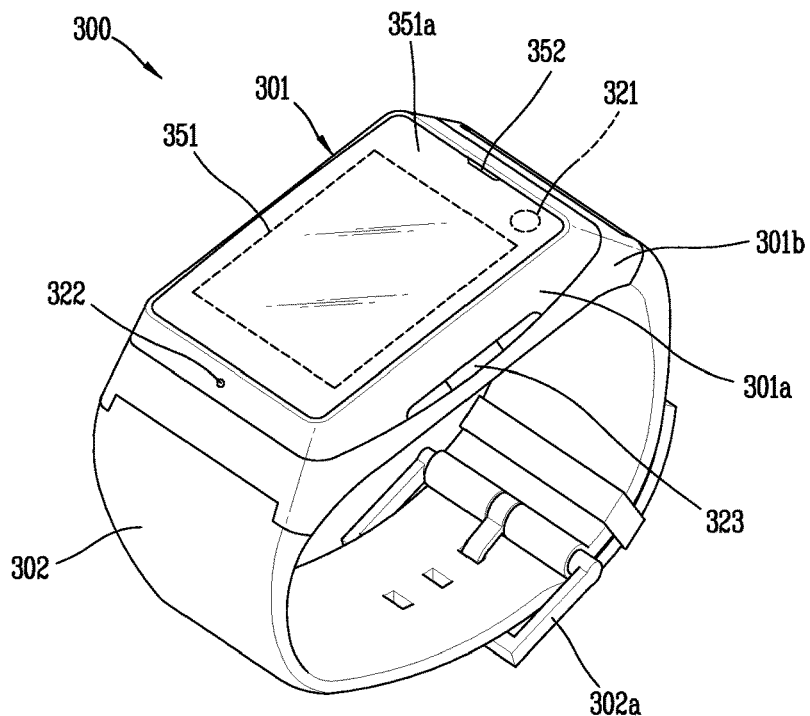
FIG. 2 is conceptual view of a watch type terminal according to another embodiment of the present disclosure.

FIG. 2 is conceptual view of a watch type mobile terminal 300 according to another embodiment of the present disclosure. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A to 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. The display unit 351 includes a touch sensor so that the display unit can function as a touch screen. As illustrated, a window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, it may function as the user input unit 323, and a separate key may thus not be provided on the main body 501. The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

Meanwhile, the band 302 may be used for extending the performance of the antenna. For example, the band may include therein a ground extending portion electrically connected to the antenna to extend a ground area. The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Hereinafter, description will be given of embodiments associated with a control method which can be implemented in the mobile terminal having such configuration, with reference to the accompanying drawings. It will be obvious to those skilled in the art that the present disclosure can be specified into other particular forms without departing from the spirit and essential characteristics of the present disclosure.

Figure 3:
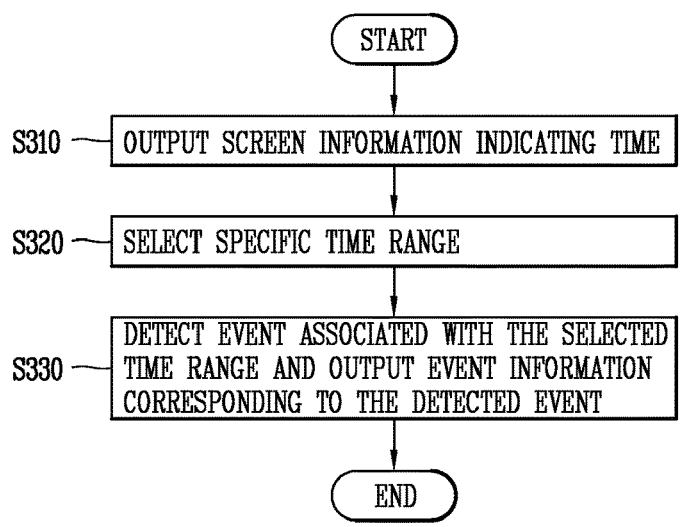
FIG. 3 is a flowchart illustrating a control method of a watch type terminal in accordance with one embodiment disclosed herein.
Figure 4A:
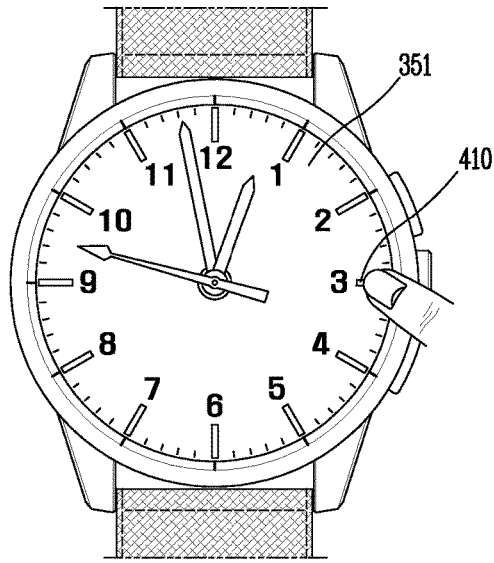
FIGS. 4(a) to 6(c) are conceptual views illustrating embodiments related to an output of event information.
Figure 4B:
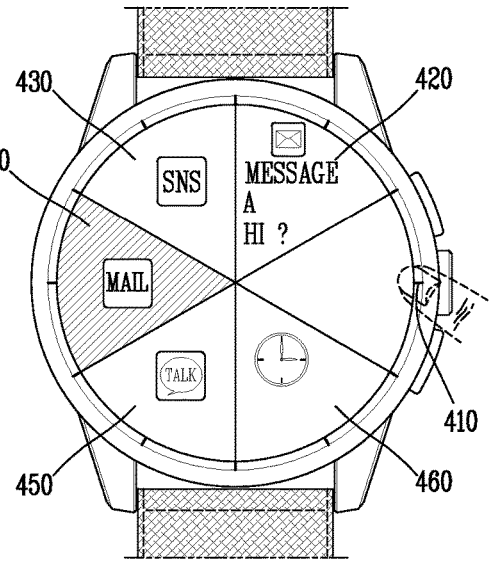
Figure 4D:
Figure 4C:
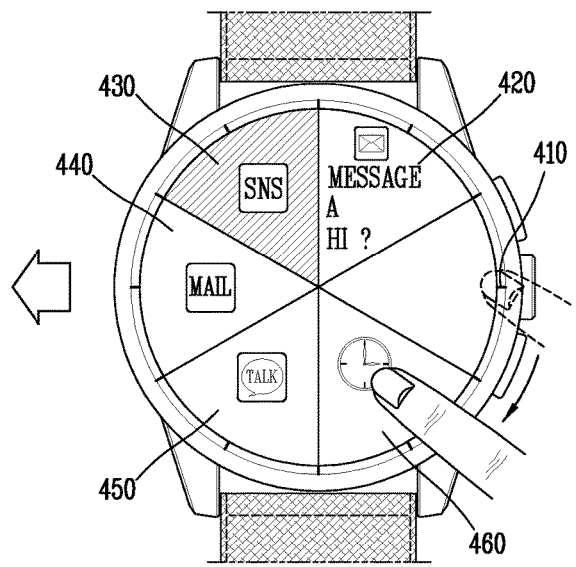
Figure 5A:
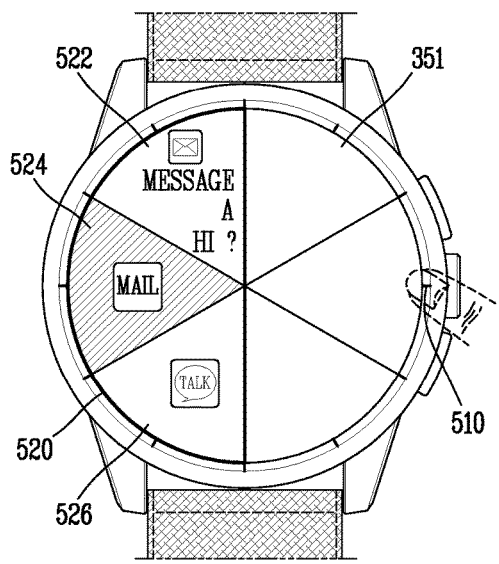
Figure 5B:
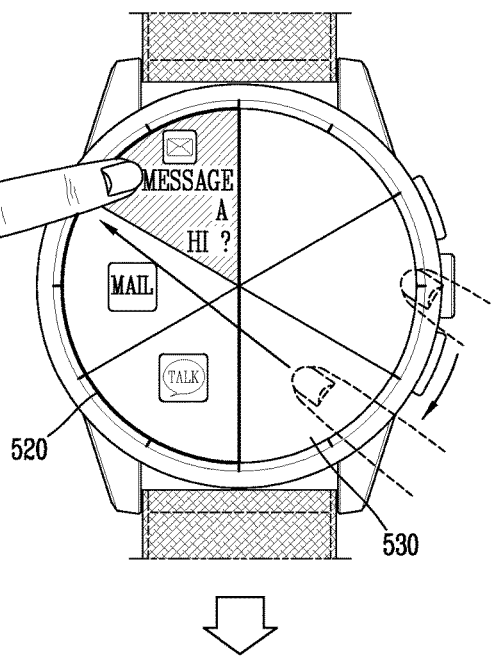
Figure 5D:
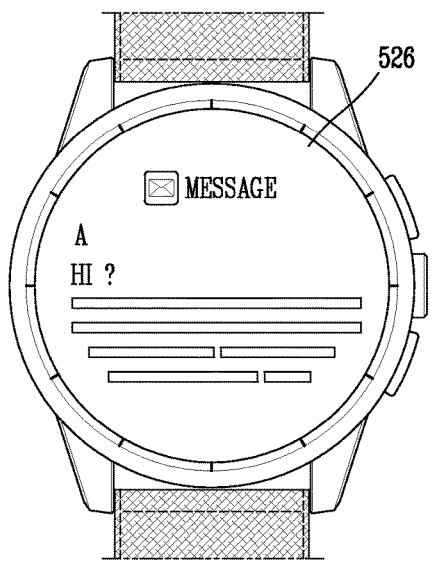
Figure 5C:
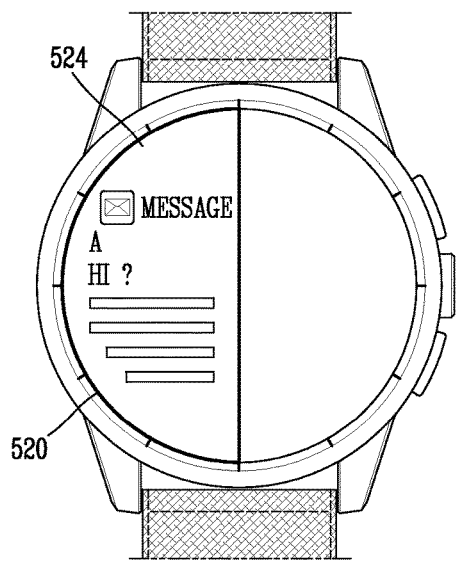

FIG. 3 is a flowchart illustrating a control method of a watch type terminal 300 (see FIG. 2) in accordance with one embodiment disclosed herein. The watch type terminal 300 includes a main body 301, a display unit 351 and a controller 180. As illustrated in FIG. 3, screen information informing of time is output on the display unit 351 (S310). In more detail, numbers, scales and the like which are capable of indicating time (hours, minutes, seconds) may be output on the display unit 351.

Afterwards, a specific time range is selected (S320). In more detail, the specific time range may be selected by a user's touch input or voice input. In one example, when the user applies a long touch to a number 2 output on the display unit 351, a time (hours) ranging from 2 am to 3 am (or 2:00 am to 3:00 am) or from 2 pm to 3 pm may be selected.

Here, a time interval may be preset. For example, when the time interval is preset to 2 hours, and when the user applies the long touch to the number 2, a time ranging from 2 pm to 4 pm may be selected. Also, the morning and the afternoon may be distinguished by touch inputs. For example, when the user applies a short touch to a number 2, a time ranging from 2 am to 3 am may be selected. When the user applies a long touch to the number 2, a time ranging from 2 pm to 3 pm may be selected.

As another example, the user may select a time range through a swipe input. In more detail, the user may apply a swipe input from a number 2 to a number 3, so as to select a time ranging from 2 pm to 3 pm. As another example, the user may select a specific time range, such as '2 pm,' 'from 2 pm to 3 pm,' or the like, through a voice input.

Next, at least one event associated with the selected time range is detected and event information corresponding to the detected event is output on the display unit 351 (S330). Specifically, an event related to a specific time range refers to an event generated within the specific time range, an event to be generated within the specific time range, and the like.

In one example, when an SNS message reception event and an email reception event are generated within the time range from 2 pm to 3 pm, which has been selected in the step S320, event information corresponding to each event may be output. In another example, when a schedule alarm is stored (preset) within the time range from 2 pm to 3 pm selected in the step S320, details of the stored schedule may be output as the event information. Here, even when a current time is 1 pm, the details of the schedule may be output as event information to be generated.

Meanwhile, event information may be output on a region of the display unit 351 excluding a region where a touch input has been applied. Also, event information selected from the output event information may be displayed on a specific region of the display unit 351 or an application linked to the selected event information may be executed on the specific region of the display unit 351. Also, the display unit 351 of the watch type terminal 300 may be implemented into various shapes, such as a circular shape, a rectangular shape, a polygonal shape and the like. Hereinafter, a circular display will be exemplarily described.

Figure 6A:
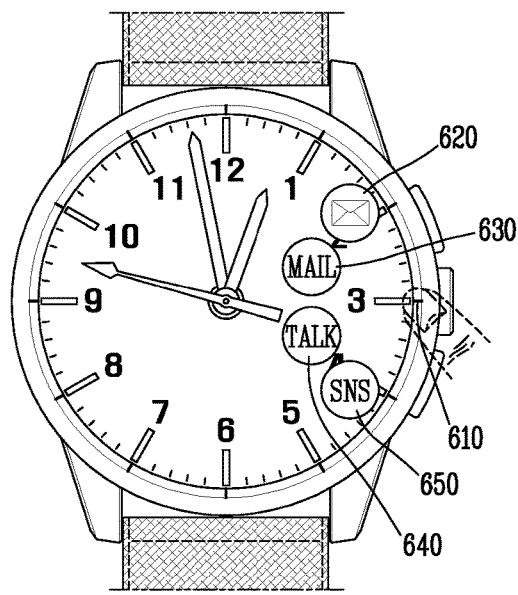
Figure 6B:
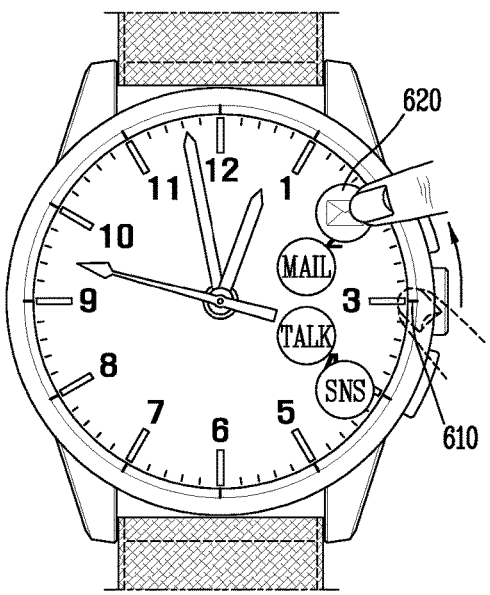
Figure 6C:
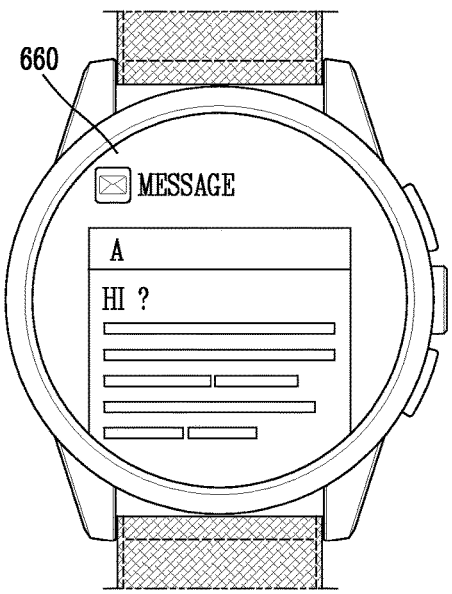

FIGS. 4 to 6 are conceptual views illustrating embodiments of an output of event information. As illustrated in (a) of FIG. 4, numbers or scales indicating time (hours, minutes, seconds) may be output on the display unit 351. Here, a user may apply a long touch to a number 3 or a scale 410 indicating the number 3 output on the display unit 351, so as to select one hour from 3 pm to 4 pm. In another example, a time (hours) continuing from a selected time may be set in various manners. That is, upon applying a long touch to the number 3 or the scale indicating the number 3, the user may select two hours from 3 pm to 5 pm.

As illustrated in (b) of FIG. 4, several pieces of event information corresponding to events associated with the selected time range may be output. In more detail, when a plurality of events are generated within a time range from 3 pm to 4 pm, event information 420, 430, 440, 450 and 460 corresponding to the plurality of events, respectively, may be output on a portion excluding a region 410 to which the user is applying the touch input. That is, the event information 420, 430, 440, 450 and 460 may be output without being obscured by the user's finger.

In an example, events such as a reception of a text message, an input of an SNS comment, a reception of an email, a reception of a message through a messenger, and the like, may be generated within the selected time (range). Also, a pre-stored schedule within the selected time range may be regarded as an event associated with the corresponding time range.

As a result, event information 420, 430, 440, 450 and 460 corresponding to each of the events, such as the reception of the text message, the input of the SNS comment, the reception of the email, the reception of the message through the messenger and the schedule within the selected time, may be output by dividing the other portion of the display unit except for the user-touched region 410. Here, the event information may be output to briefly inform of an event attribute. For example, as the event information 420 which corresponds to the text message reception event, a text message icon, a recipient, a part of details of the received message and the like may be output.

Also, the user may select one of the event information 420, 430, 440, 450 and 460 by applying a preset type of touch input. For example, the event information 440 related to the email reception event, which is output at the opposite side of the user touched region 410, may be selected. To indicate it, the selected event information 440 corresponding to the email reception event may be focused with a different color or pattern. Also, the user-touched region 410 may be output with being blurred.

Meanwhile, the user may change selected event information by a preset touch input. For example, the user's finger may be located on a region where the event information 460 corresponding to an alarm event is output, in response to a clockwise swipe input. As illustrated in (c) of FIG. 4, in response to the swipe input started in (b) of FIG. 4, the event information 430 corresponding to the SNS comment input event, which is being output at the opposite side of the user-touched region where the alarm event information 460 is output, may be selected.

Thus, the user may select event information, which is being output on the opposite side of a user-touched region. Consequently, the event information which the user desires to select may not be obscured by his/her finger, improving user convenience. As illustrated in (d) of FIG. 4, when the user's finger is taken away in (c) of FIG. 4, an application 432 linked to the selected event information 430 is activated entirely on the display unit 351. In more detail, each of those event information 420, 430, 440, 450 and 460 which has been output may disappear, and the corresponding SNS 432 may be executed as the application linked to the SNS comment input event information 430 selected.

As another example, referring to (a) of FIG. 5, when the user applies a long touch to a region 510 including a number 3, event information 522, 524 and 526 related to events, which have been generated between 3 pm and 4 pm, may be output on a half region 520 of the display unit 351 at the opposite side of the long-touched region 510. In such a manner, the region 520 on which those pieces of event information are output and the user-touched region 510 may be distinguishable from each other. That is, the event information 522, 524 and 526 may be output away from the user-touched region 510, so as not to be obscured due to the touched finger.

Also, the user may select event information, which is output on the opposite region of the touched region, from those event information output. In one example, the user may select the event information 524 related to the email reception event, which is being output on the opposite region of the user-touched region 510. To indicate it, the selected event information 524 corresponding to the email reception event may be focused (indicated) with a different color.

Then, the user may change the selected event information by applying a preset touch input. As illustrated in (b) of FIG. 5, in response to a clockwise swipe input, the event information 522 related to the text message reception event, which is being output on the opposite side of a region 530 where the user's finger is located, may be selected.

As illustrated in (c) of FIG. 5, when the user takes the finger away from the touched region 530 in (b) of FIG. 5, the selected event information 522 corresponding to the text message reception event may be output on the half region 520. Here, the event information 524 related to the text message reception event may include more information than illustrated in (b) of FIG. 5.

In more detail, with the increased region where the event information 524 can be output, a text message icon, a name of a text message application, an originator (sender) of the text message, some details of the text message and the like may be output. As illustrated in (d) of FIG. 5, when the user applies a swipe input from the touched region 530 to the region where the selected event information 522 related to the text message reception event is output, a text message application 526 may be activated on an entire screen. As another example, when the user applies a swipe input toward a bezel of the display unit 351 in (b) of FIG. 5, those event information 522, 524 and 526 output may disappear, and an initial clock screen (see (a) of FIG. 4) may be displayed again.

As another example, as illustrated in (a) of FIG. 6, when the user applies a long touch to a region 610 including a number 3, event information 620, 630, 640 and 650 corresponding to events generated between 3 pm and 4 pm may be output. In more detail, each event information 620, 630, 640 and 650 may be briefly output in the form of an icon indicating the generated event. For example, the event information 620 corresponding to a message reception event may be displayed with a message icon. As illustrated in (b) and (c) of FIG. 6, when the user applies a swipe input toward the message icon corresponding to the event information 620 related to the message reception event, a received message 660 may be output entirely on the display unit 351.

Meanwhile, an area (extent) of a region of the display unit 351 on which event information is output may be set by a preset type of touch input applied to the display unit 351. Also, event information may be output in a different form according to the area of the set region of the display unit 351.

Figure 8A:
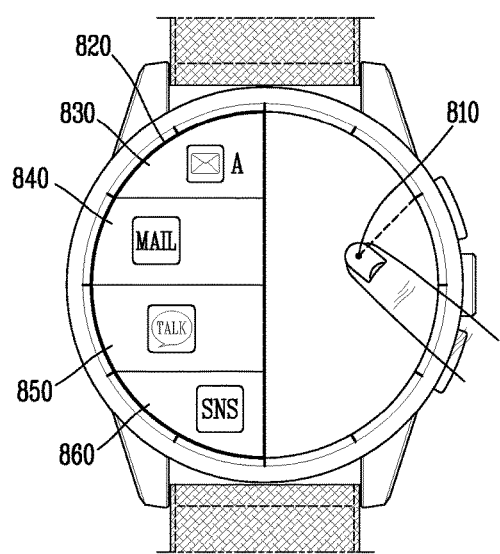
Figure 8B:
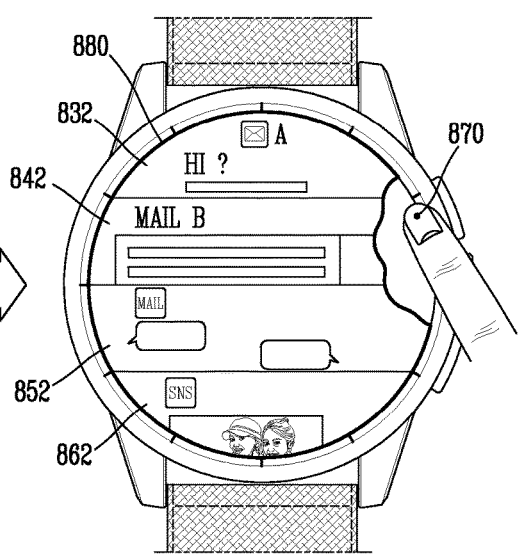
Figure 9A:
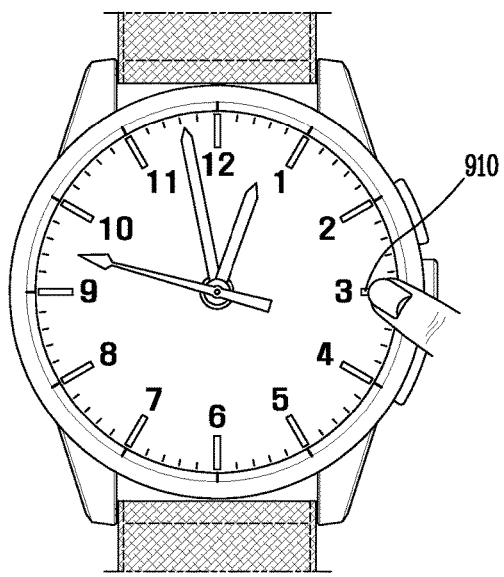
Figure 9B:
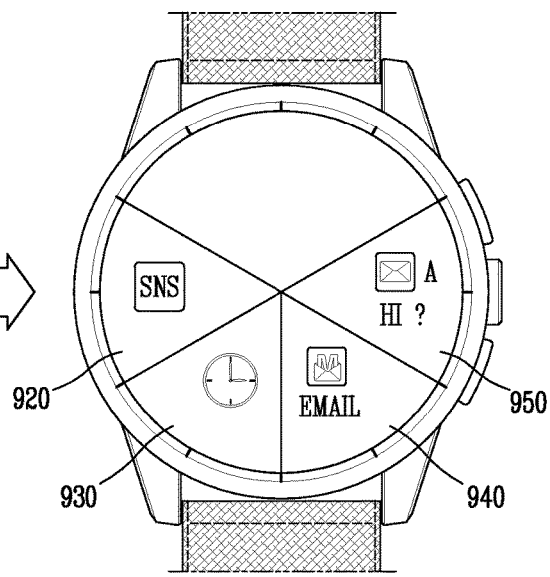
Figure 9D:
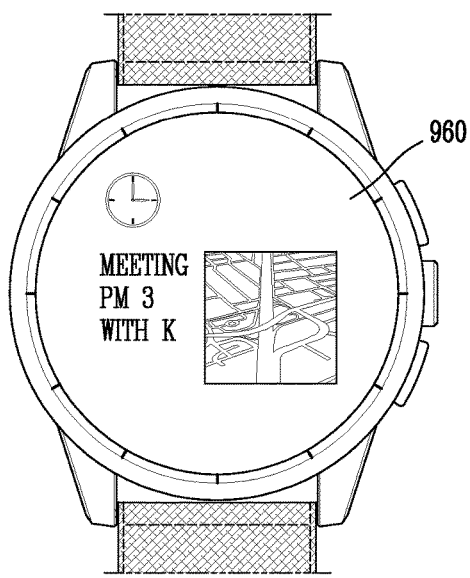
Figure 9C:
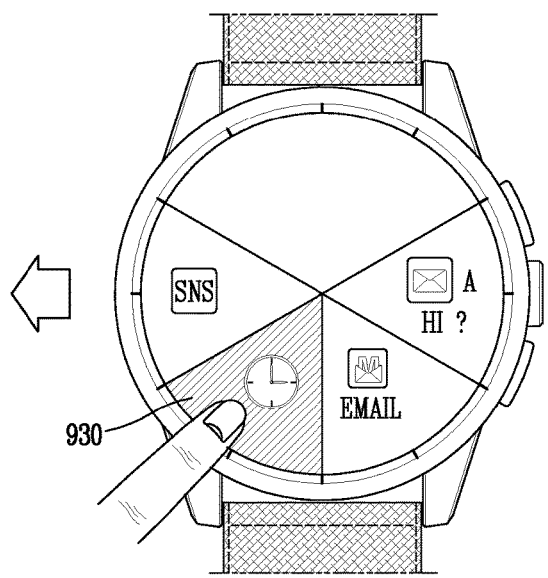
Figure 10A:
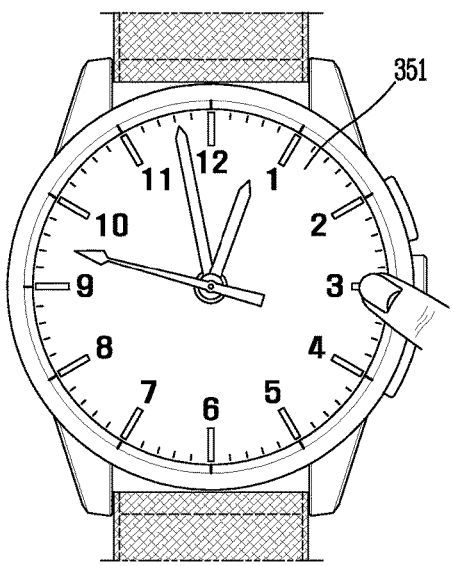
Figure 10B:
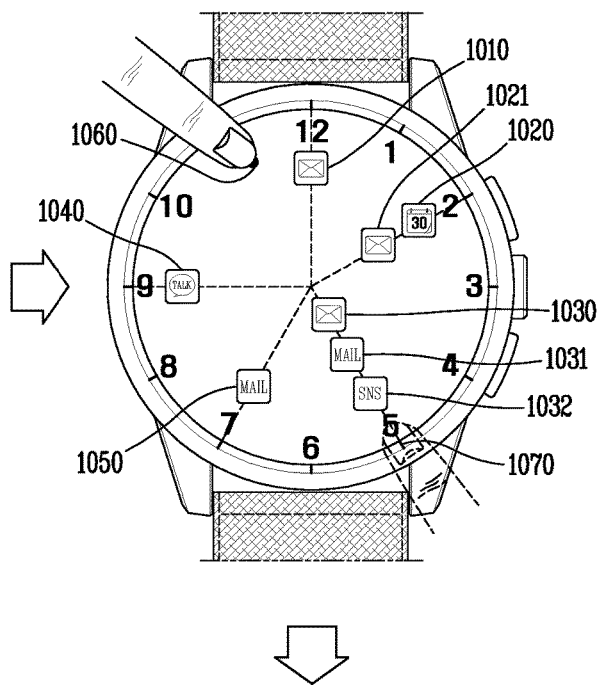
Figure 10D:
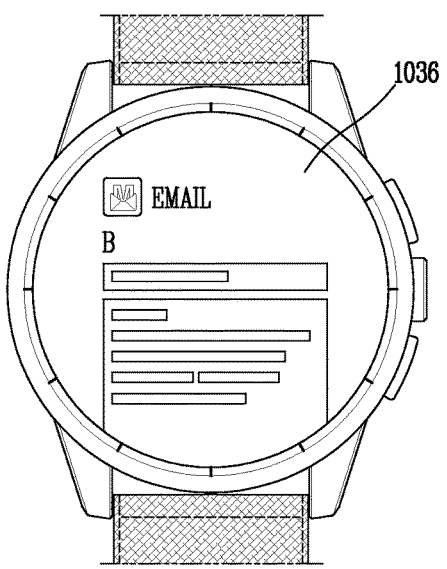
Figure 10C:
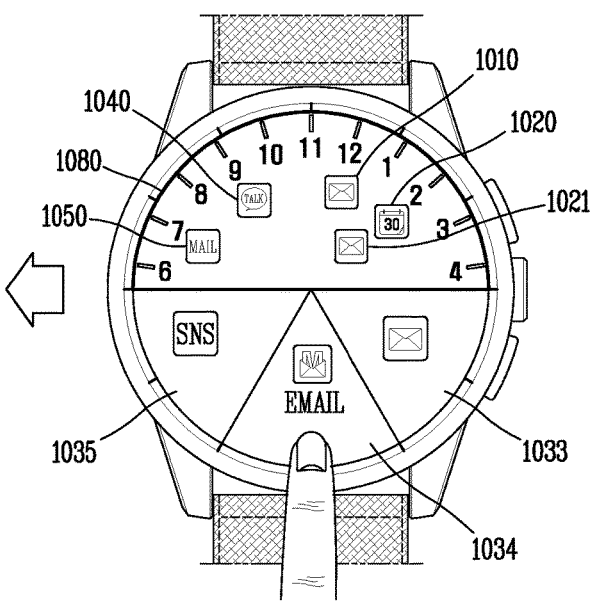
Figure 11A:
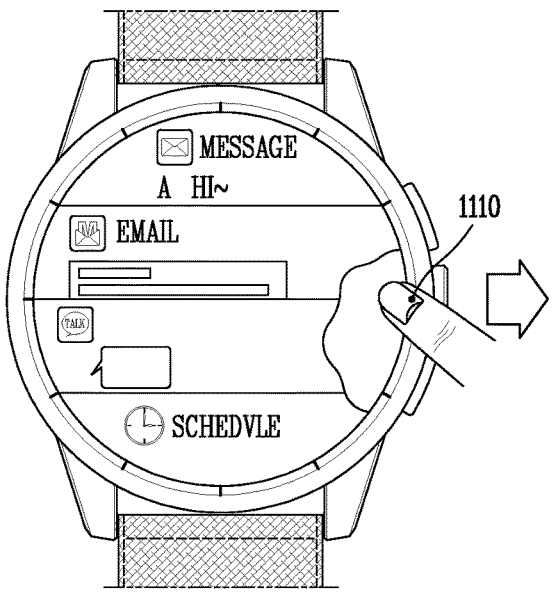
Figure 11B:
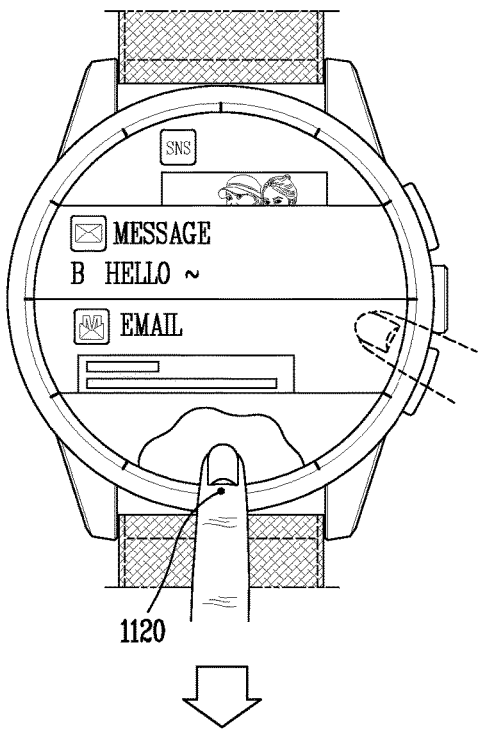
Figure 11D:
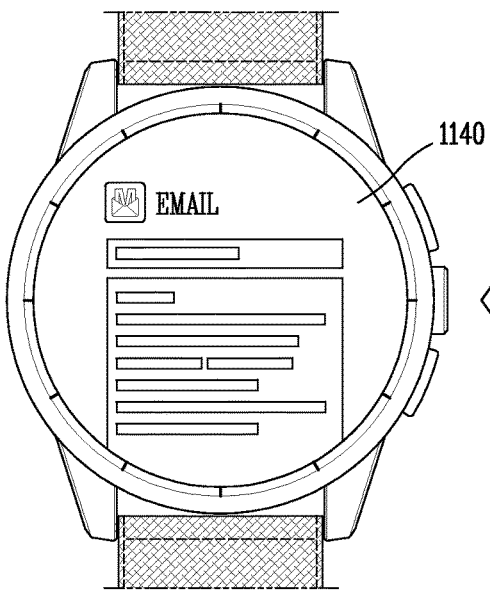
Figure 11C:
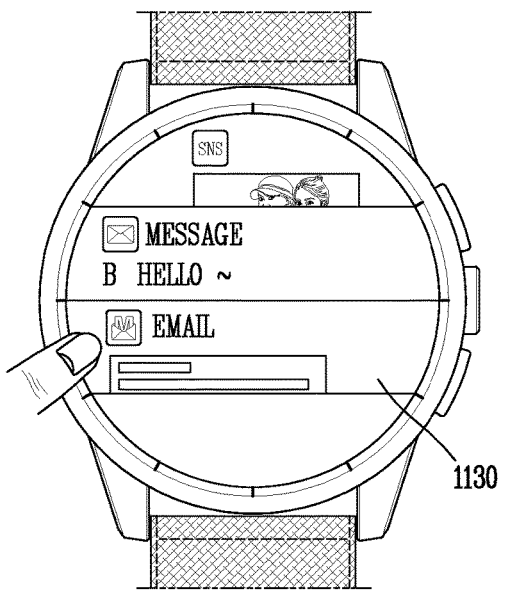

FIGS. 7 and 8 are conceptual views illustrating embodiments in which event information is output in a different manner according to an extent of a touch region. Referring to (a) of FIG. 7, as aforementioned, when the user applies a long touch to a region 710 including a number 3, event information 720, 730, 740 and 750 corresponding to events generated within a time range between 3 pm and 4 pm may be output.

In more detail, each event information 720, 730, 740 and 750 may be briefly output in the form of an icon indicating the event generated. For example, the event information 730 corresponding to an email reception event may be displayed in the form of an email icon. As illustrated in (b) of FIG. 7, the user may set a region for outputting the event information 720, 730, 740 and 750 by applying a swipe input. In more detail, the user may apply the swipe input up to a point 760 where the user desires to output the event information 720, 730, 740 and 750.

As illustrated in (c) of FIG. 7, event information 722, 732, 742 and 752 may be output up to the point 760 to which the swipe input has been applied in a spreading manner. In more detail, the event information 722, 732, 742 and 752 may be individually output by including more details than them illustrated in (b) of FIG. 7. For example, the event information represented merely with the icons in (b) of FIG. 7 may be output by including application names and the like.

As illustrated in (d) of FIG. 7, event information 724, 734, 744 and 754 may be output in a spreading manner up to a point 770 where another swipe input is applied by the user. In more detail, those event information 724, 734, 744 and 754 may be output by including more details than them illustrated in (c) of FIG. 7. For example, the event information 724 corresponding to a text message reception event may include some details of the text message received, along with the message icon and the message application name output in (c) of FIG. 7.

As another example, the event information 734 corresponding to an email reception event may include an email sender (originator), some details of the received email and the like, along with the email icon and the email application name output in (c) of FIG. 7. In such a manner, with the increased extent of the region for outputting the event information therein, more information related to the event may be output.

As another example, as illustrated in (a) of FIG. 8, when the user touches and selects a region 810 indicating a time ranging from 2 pm to 3 pm, event information 830, 840, 850 and 860 related to events generated within the corresponding time range may be output on a half region 820 of the display unit 351. As illustrated in (b) of FIG. 8, when the user selects a time ranging from 2 pm to 3 pm by touching a region 870 including a number 2, event information 832, 842, 852 and 862 may be output on a region 880 except for the region 870 including the number 2.

That is, as illustrated in (a) and (b) of FIG. 8, a region for outputting event information therein may be differently set according to an extent (or area) of a user-touch region. Also, even event information related to the same event may be differently output according to the extent of the set region. For example, regarding to a messenger event, a messenger icon and a messenger name may be output as the event information 850 in (a) of FIG. 8, and the messenger icon, the messenger name and some details of chatted messages may be output as the event information 852 in (b) of FIG. 8 by virtue of the increased extent for outputting the event information 832, 842, 852 and 862.

FIGS. 9 to 13 are conceptual views illustrating other embodiments of an output of event information. As illustrated in (a) of FIG. 9, the user may select a time range from 3 pm to 4 pm by touching a region 910 including a number 3. As another example, the user may input a voice, such as '3 pm to 4 pm' through a microphone 322.

As illustrated in (b) of FIG. 9, event information 920, 930, 940 and 950 related to events generated in the time range from 3 pm to 4 pm may be output. For example, the event information 920, 930, 940 and 950 may be output on an entire screen of the display unit 351 or by dividing a preset specific region of the display unit 351.

As illustrated in (c) of FIG. 9, one of those event information 920, 930, 940 and 950 output may be touched by the user for selection. For example, the user may select schedule alarm event information 930 by touching a region where the event information 930 related to the schedule alarm (notification) event is output. As illustrated in (d) of FIG. 9, an application 960 linked to the schedule alarm event information 930, which is selected by the user's touch input, may be executed on an entire screen of the display unit 351. As another example, as illustrated in (a) and (b) of FIG. 10, when the user applies a long touch to a clock screen, icons 1010, 1020, 1021, 1030, 1031, 1032, 1040 and 1050 of event information related to the whole time may be output on the time basis.

In more detail, when a text message is received at a time ranging from 12 pm to 1 pm, a text message icon 1010 may be output near a number 12. Similarly, when a messenger message is received at a time ranging from 9 am to 10 am, a messenger icon 1040 may be output near a number 9. When an email is received at a time ranging from 7 pm to 8 pm, an email icon 1050 may be output near a number 7.

Also, when a schedule alarm has been set to 2 pm and a text message is received at a time ranging from 2 pm to 3 pm, a schedule alarm icon 1020 and a text message icon 1021 may be output together near a number 2.

In the similar manner, when a message reception event, an email reception event and an SNS comment input event are generated within a time ranging from 5 pm to 6 pm, a text message icon 1030, an email icon 1031 and an SNS icon 1032 may be all output near a number 5. Here, when the user touches one region 1060 where any of those icons 1010, 1020, 1021, 1030, 1031, 1032, 1040 and 1050 of the event information has not been output, the clock screen as illustrated in (a) of FIG. 10 may be displayed again.

As illustrated in (c) of FIG. 10, when the user touches a region 1070 with the number 5 for selection, event information 1033, 1034 and 1035 corresponding to the events generated within the time ranging from 5 pm to 6 pm may be output on a partial region of the screen. Also, the icons 1010, 1020, 1021, 1040 and 1050 of the event information generated in the time range from 5 pm to 6 pm as the selected time range may be output on a region 1080 except for the region, in which the event information 1033, 1034 and 1035 are output, in a reduced manner.

Here, sizes of numbers, scale intervals and the like indicating time (hours, minutes, etc.) except for the selected time range may be adjusted according to an extent of the region 1080 except for the region with the event information 1033, 1034 and 1035 output therein. That is, the numbers and the icons 1010, 1020, 1021, 1040 and 1050 of the event information may be output in reduced sizes, and even the intervals of the time scales may also be reduced according to the extent of the output region 1080.

As illustrated in (d) of FIG. 10, when the user selects event information 1034 related to an email reception event, which is one of the event information 1033, 1034 and 1035 output in response to the user touch input in (c) of FIG. 10, a corresponding email application 1036 may be executed on the entire screen 351. As another example, as illustrated in (a) of FIG. 11, when the user touches a region 1110 including a number 3 for selection, event information corresponding to events generated within a time ranging from 3 pm to 4 pm may be enumerated on a region except for the touched region 1110.

As illustrated in (b) of FIG. 11, when the user applies a swipe input starting from the region 1110 with the number 3 to a region 1120 with a number 6, event information corresponding to events generated within a time ranging from 6 pm to 7 pm may be enumerated on a region except for the touched region 1120. That is, the user may continuously check event information related to events generated within a specific time range, through a swipe input.

As illustrated in (c) and (d) of FIG. 11, the user may touch and select event information 1130 related to an email reception event as one of event information related to events generated in the time ranging from 6 pm to 7 pm. Accordingly, an email application 1140 linked to the selected event information 1130 corresponding to the email reception event may be executed on an entire region of the screen.

Figure 12A:
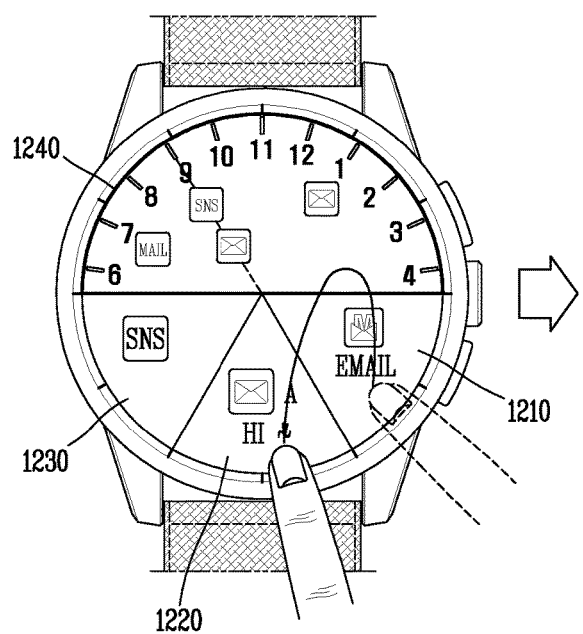
Figure 12B:
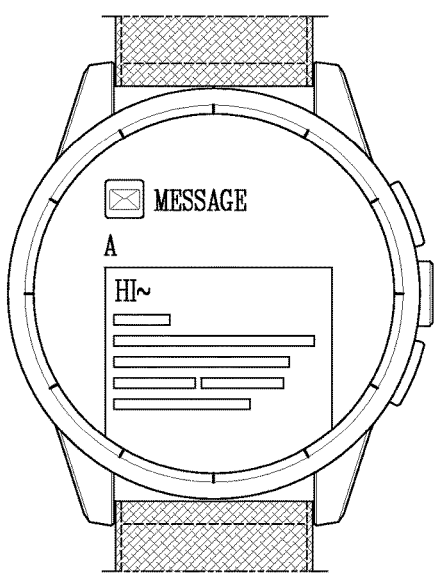

As another example, as illustrated in (a) of FIG. 12, event information 1210, 1220 and 1230 related to events generated within the selected time, namely, within the time ranging from 5 pm to 6 pm as illustrated in (c) of FIG. 10, may be output on a partial region, and icons associated within event information related to other events generated within a time except for the selected time range may be output on the other region 1240 in a reduced manner.

Here, the user may drag the touch input to an outer region 1240 of the region where those pieces of event information 1210, 1220 and 1230 are output, and continuously drag it to text message reception event information 1220 as one of the event information 1210, 1220 and 1230. As illustrated in (b) of FIG. 12, a text message application 1250 may be executed on the entire screen in response to the user's drag input applied to the text message reception event information 1220.

As another example, as illustrated in (a) of FIG. 13, event information 1310, 1320 and 1330 related to events generated within the selected time, namely, within the time ranging from 5 pm to 6 pm as illustrated in (a) of FIG. 12, may be output on a partial region, and icons associated with event information generated in a time except for the selected time range may be output on the other region 1340 in a reduced manner.

Here, the user may apply a drag input starting from the region, on which those pieces of event information 1310, 1320 and 1330 are output, to a region 1350 including a number 9, so as to select a time ranging from 9 am to 10 am. As illustrated in (b) of FIG. 13, event information 1360 and 1370 related to events generated within the time range from 9 am to 10 am may be output on a partial region of the screen. Also, icons associated with event information generated in a time except for the selected time range may be output on the other region 1380 in a reduced manner.

As another example, still referring to (a) and (b) of FIG. 13, the user may apply a drag input 1392, starting from a circular region 1390 within the display unit 351 to a region 1350 including a number 9, so as to select a time ranging from 9 am to 10 am. Also, the user may apply a drag input toward a bezel 1394 of the display unit 351, such that the output of event information can be stopped and an initial clock screen can be displayed again.

In accordance with at least one of embodiments disclosed herein, event information related to a selected time range can be checked in an easy, fast manner. Further, a user may adjust a region for outputting events and a quantity of event information to be output. In addition, event information can be output on a region except for a touch region, which may result in improvement of user convenience.

Further, the present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type terminal comprising:
    a main body;
    a touch screen provided on a front surface of the main body and configured to display time information; and
    a controller configured to:
    receive an input for selecting a first specific time range included in the displayed time information,
    detect at least one event generated within the first specific time range,
    display event information corresponding to the detected event generated within the first specific time range,
    receive an input for selecting a second specific time range included in the displayed time information,
    detect at least one event generated within the second specific time range, and
    display event information corresponding to the detected event generated within the second specific time range,
    wherein the controller is further configured to:
    receive an input for selecting a third specific time range included in the displayed time information,
    display event information corresponding to at least one event generated within the third specific time range on a partial region of the screen, and
    display event information corresponding to at least one event generated within a time range excluding the third specific time range on a remaining region excluding the partial region in a reduced manner,
    wherein the controller is further configured to:
    receive a predetermined touch input on the touch screen,
    display icons for event information corresponding to events generated within an entire time included in the displayed time information on boundary lines connecting a center of the displayed time information and numbers representing times corresponding to the generated events,
    receive an input for selecting a number of a time included in the displayed time information, and
    move all icons on a boundary line corresponding the selected number to a first region on the touch screen and move all other icons not on the boundary line corresponding to the selected number to a second region, and
    wherein the all other icons and corresponding numbers are displayed in a reduced size.

2. The watch type terminal of claim 1, wherein the input for selecting the specific time range includes a touch input applied onto a specific region of the displayed time information.

3. The watch type terminal of claim 2, wherein the controller is further configured to:
    display the event information on another region other than the specific region to which the touch input has been applied.

4. The watch type terminal of claim 2, wherein the controller is further configured to:
    select event information displayed on an opposite region of the specific region, and
    output an effect indicating the opposite region includes the selected event information.

5. The watch type terminal of claim 4, wherein the controller is further configured to:
    execute an application linked to the selected event information, and
    display contents of the selected event information.

6. The watch type terminal of claim 4, wherein the controller is further configured to:
    execute the application and display the contents based on a release of the touch input.

7. The watch type terminal of claim 1, wherein the controller is further configured to:

display contents of the event information according to a type of the touch input.

8. The watch type terminal of claim 7, wherein the controller is further configured to:
display the contents on a partial portion of the touch screen based on a first type of the touch input and display the contents on a full portion of the touch screen based on a second type of touch input different than the first type of touch input.

9. The watch type terminal of claim 1, wherein the at least one event includes a plurality of different events, and
wherein the controller is further configured to display different event information corresponding the different events on different regions of the touch screen.

10. The watch type terminal of claim 1, wherein the controller is further configured to:
display at least one of an icon corresponding to the event information and a name of an application linked to the event information on the touch screen, and
display contents of the event information based on a touch selection of the displayed at least one icon.

11. The watch type terminal of claim 10, wherein the controller is further configured to:
display the at least one icon in a region of the touch screen defined by a dragging of the touch input.

12. The watch type terminal of claim 11, wherein the controller is further configured to:
expand or decrease the region for displaying the at least one icon on the touch screen based on increase or decrease of the dragging of the touch input, respectively, and
increase or decrease an amount of contents displayed for the event information based on the increase or decrease of the dragging of the touch input, respectively.

13. The watch type terminal of claim 1, wherein the controller is further configured to:
in response to a drag input applied to a bezel side of the watch type terminal, stop displaying the event information and display an initial clock screen.

14. A method of controlling a watch type terminal, the method comprising:
displaying time information of a touch screen provided on a front surface of a main body of the watch type terminal;
receiving, via a controller of the watch type terminal, an input for selecting a first specific time range included in the displayed time information;
detecting, via the controller, at least one event generated within the first specific time range;
displaying, via the controller, event information corresponding to the detected event generated within the first specific time range;
receiving, via the controller of the watch type terminal, an input for selecting a second specific time range included in the displayed time information;
detecting, via the controller, at least one event generated within the second specific time range; and
displaying, via the controller, event information corresponding to the detected event generated within the second specific time range,
wherein the method further comprises:
receiving, via the controller, an input for selecting a third specific time range included in the displayed time information;
displaying, via the controller, event information corresponding to at least one event generated within the third specific time range on a partial region of the screen; and
displaying, via the controller, event information corresponding to at least one event generated within a time range excluding the third specific time range on a remaining region excluding the partial region in a reduced manner,
wherein the method further comprises:
receiving, via the controller, a predetermined touch input on the touch screen;
displaying, via the controller, icons for event information corresponding to events generated within an entire time included in the displayed time information on boundary lines connecting a center of the displayed time information and numbers representing times corresponding to the generated events;
receiving, via the controller, an input for selecting a number of a time included in the displayed time information; and
moving, via the controller, all icons on a boundary line corresponding the selected number to a first region on the touch screen and move all other icons not on the boundary line corresponding to the selected number to a second region, and
wherein the all other icons and corresponding numbers are displayed in a reduced size.

15. The method of claim 14, wherein the input for selecting the specific time range includes a touch input applied onto a specific region of the displayed time information.

16. The method of claim 15, further comprising:
displaying the event information on another region other than the specific region to which the touch input has been applied.

17. The method of claim 15, further comprising:
selecting event information displayed on an opposite region of the specific region; and
outputting an effect indicating the opposite region includes the selected event information.

18. The method of claim 17, further comprising:
executing an application linked to the selected event information; and
displaying contents of the selected event information.

19. The method of claim 17, further comprising:
executing the application and display the contents based on a release of the touch input.

20. The method of claim 14, further comprising:
displaying contents of the event information according to a type of the touch input.

21. The method of claim 20, further comprising:
displaying the contents on a partial portion of the touch screen based on a first type of the touch input and displaying the contents on a full portion of the touch screen based on a second type of touch input different than the first type of touch input.

* * * * *